United States Patent [19]
Field

[11] Patent Number: 5,615,565
[45] Date of Patent: Apr. 1, 1997

[54] KEYS FOR CYLINDER LOCKS

[75] Inventor: Peter H. Field, Salem, Va.

[73] Assignee: Medeco Security Locks, Inc., Salem, Va.

[21] Appl. No.: 530,515

[22] Filed: Sep. 19, 1995

[51] Int. Cl.⁶ .................................................. E05B 19/06
[52] U.S. Cl. .................................................. 70/409; 70/406
[58] Field of Search ........................... 70/409, 405, 406, 70/407, 408, 411, 386

[56] References Cited

U.S. PATENT DOCUMENTS

| | | | |
|---|---|---|---|
| 1,244,450 | 10/1917 | Christoph | 70/405 |
| 1,439,382 | 12/1922 | Segal . | |
| 1,603,635 | 10/1926 | Norung | 70/405 |
| 1,795,318 | 3/1931 | Simon | 70/406 |
| 2,057,532 | 10/1936 | MacDonald | 70/409 |
| 2,116,246 | 5/1938 | MacDonald | 70/405 |
| 2,157,142 | 5/1939 | Olson | 70/406 |
| 3,420,077 | 1/1969 | Drazin | 70/356 |
| 3,499,302 | 3/1970 | Spain et al. . | |
| 3,722,240 | 3/1973 | Spain et al. . | |
| 3,889,501 | 6/1975 | Fort | 70/283 |
| 4,111,021 | 9/1978 | Roberts | 70/406 |
| 4,232,539 | 11/1980 | Lo | 70/364 R |
| 4,289,002 | 9/1981 | Gretler . | |
| 4,343,166 | 8/1982 | Hofmann . | |
| 4,356,713 | 11/1982 | Widen | 70/364 A |
| 4,393,673 | 7/1983 | Widen | 70/358 |
| 4,505,139 | 3/1985 | Richards | 70/221 |
| 4,553,452 | 11/1985 | Keller . | |
| 4,815,307 | 3/1989 | Widen | 70/493 |
| 4,964,288 | 10/1990 | Braun et al. . | |
| 5,101,648 | 4/1992 | Kuster . | |
| 5,131,248 | 7/1992 | Ho | 70/366 |
| 5,428,978 | 7/1995 | Tsukano | 70/386 |
| 5,491,993 | 2/1996 | Anderson | 70/367 |

*Primary Examiner*—Steven N. Myers
*Assistant Examiner*—Donald J. Lecher
*Attorney, Agent, or Firm*—Rothwell, Figg, Ernst & Kurz

[57] ABSTRACT

A key with a blade portion which is bitted for actuating the tumbler pins of a cylinder lock has improved cross-sectional strength despite deep cut bittings which extend well into the thickness of the blade. The key is generally flat with upper and lower surfaces and opposite short side edges. The bittings are cut across at least one of the surfaces so as to extend arcuately through the thickness of the blade and one of the side edges. The volume of key blank material which is adjacent the deep cut bittings after the key is cut is substantially more than conventional keys and provides the key blade with increased strength to prevent breakage. The bittings are cut into the key blade by a rotary cutter wheel which is dimensioned to form an arcuate bitting surface rather than a flat surface. A cylinder lock includes a rotatable plug having a tenon with a plurality of corner portions, and a keyway passing through the plug and tenon is configured to permit all of the tenon corners to remain intact, thereby providing secure seating of a tailcam on the tenon.

13 Claims, 5 Drawing Sheets

KEYS FOR CYLINDER LOCKS

BACKGROUND OF THE INVENTION

1. Field of the Invention

The present invention relates generally to improved keys for cylinder locks and, more particularly, to bitted keys having increased strength to prevent their breakage.

2. Description of Relevant Art

Yale type cylinder locks are well known and have been in continuous use since 1865. Typically, in such locks key differs (i.e., bitting combinations) are developed by adjusting incrementally the lengths of the lower pin tumblers and the corresponding depths of the bitting surfaces on the key blade. U.S. Pat. Nos. 3,499,302 and 3,722,240 to Spain et al. (1970) disclosed tumbler pins with chisel-shaped tips which were rotatable to predetermined positions by skew cut bittings on a key, the tumbler pins operating in conjunction with a side bar mechanism to provide the lock with a dual locking feature. For example, see FIG. 1 of the present application which illustrates such a high security cylinder lock manufactured by Medeco Security Locks, Inc. The aforesaid patents greatly improved the state of the cylinder lock art by teaching tumbler pins which, in addition to the traditional elevational positioning, were rotationally positioned. This significantly increased the number of unique key differs, for example, from 1,000,000 to 729,000,000 in a lock having six tumbler pins.

Increasing the number of key bitting increments results in a higher number of unique key differs. This greatly reduces the potential for any key operating a cylinder other than its own. Patents issued for the great majority of lock cylinders on the market have expired. Their keys can be copied on conventional machines of the type described in U.S. Pat. No. 1,439,382. The keyblanks required are widely distributed beyond the control of the lock manufacturer. The development of skew cut bittings provided additional security to the key owner because conventional rotary machines would not duplicate these angled cuts. As there have been machines developed to duplicate skew cut bittings, their security has been reduced. Uniquely shaped bittings and controlled distribution of proprietary keyblanks reduces the odds that keys in the possession of dishonest employees can be copied at hardware stores and the like. Notwithstanding improvements in the well worked locking arts, there remains a continuous need for mechanisms which can provide an extraordinary number of unique keys which are not subject to unauthorized duplication.

With the advent of elevational and rotational positioning of tumbler pins within the lock cylinder, the shapes of the pin tips and corresponding key bitting surfaces became a significant factor in the operation of the lock. For example, skew cut key bittings forced the tumbler pins to rotate to a precise position to permit operation of the lock. Irregularly or imprecisely configured surfaces on either the pin tips or the key bittings prevented proper positioning of the pins and operation of the lock. The desire in the art to produce numerous key differs has resulted in other problems as well.

One problem which has arisen is that the strength of the key blade is sometimes compromised as a result of the bittings cut therein. Specifically, the bittings are cut in the key blade at various depths and, as such, some areas of the key blade have more material removed (and thus are weaker) than other areas of the blade. The deep cut bittings which extend a considerable distance into the thickness (cross-section) of the key blade require removal of a substantial volume of blank material and produce significantly weakened areas of the blade. This has resulted in key blades breaking at the weakened areas, for example, due to the forces the blade is subjected to when inserted into the keyway of a lock and torqued by a user grasping the key bow.

Figure 2:
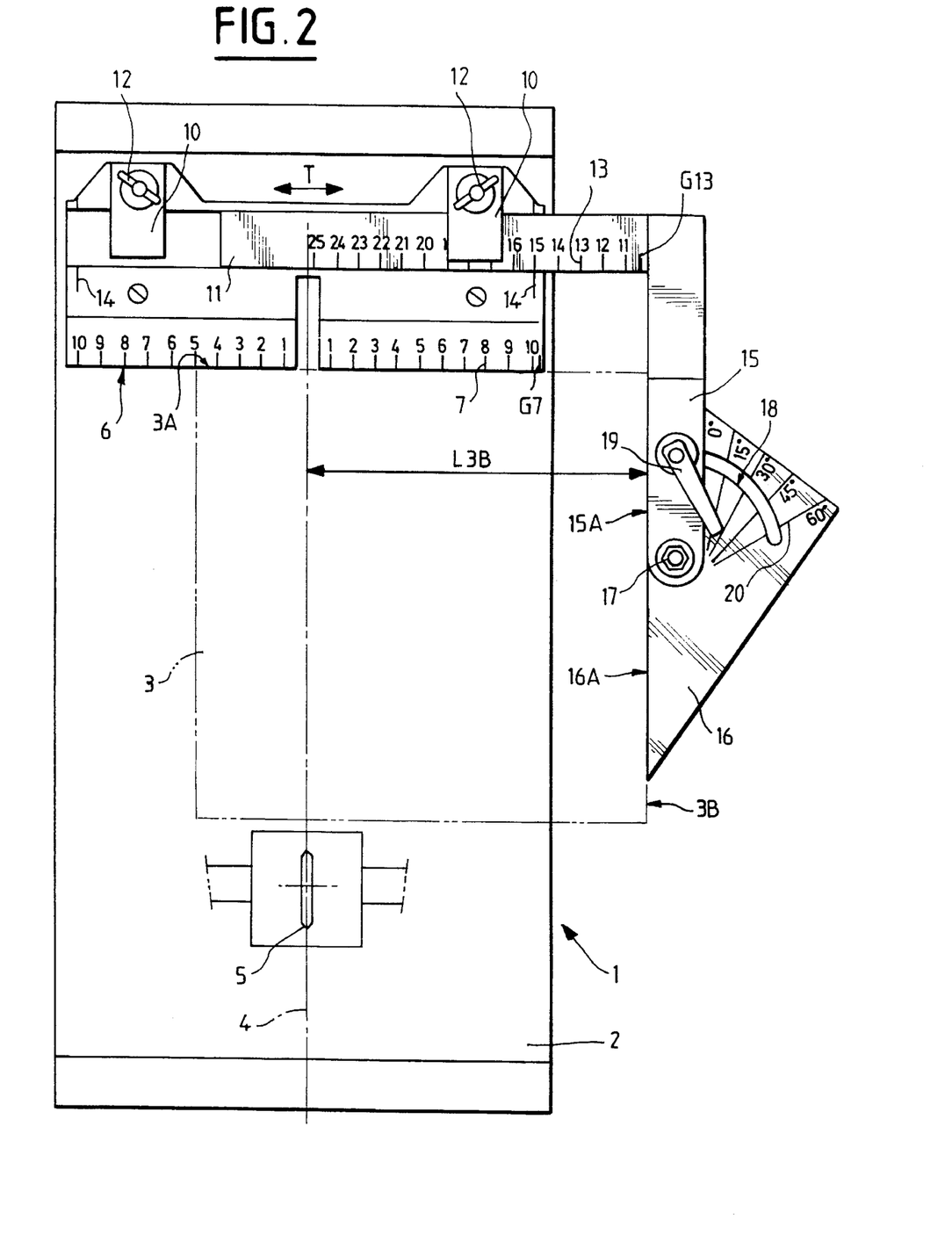
FIGS. 2A and 2B are, respectively, plan and side elevation views of a prior art key.
Figure 2A:
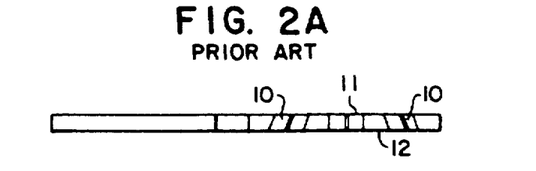
Figure 2B:
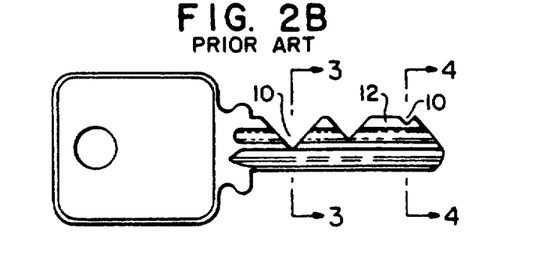
Figure 3:
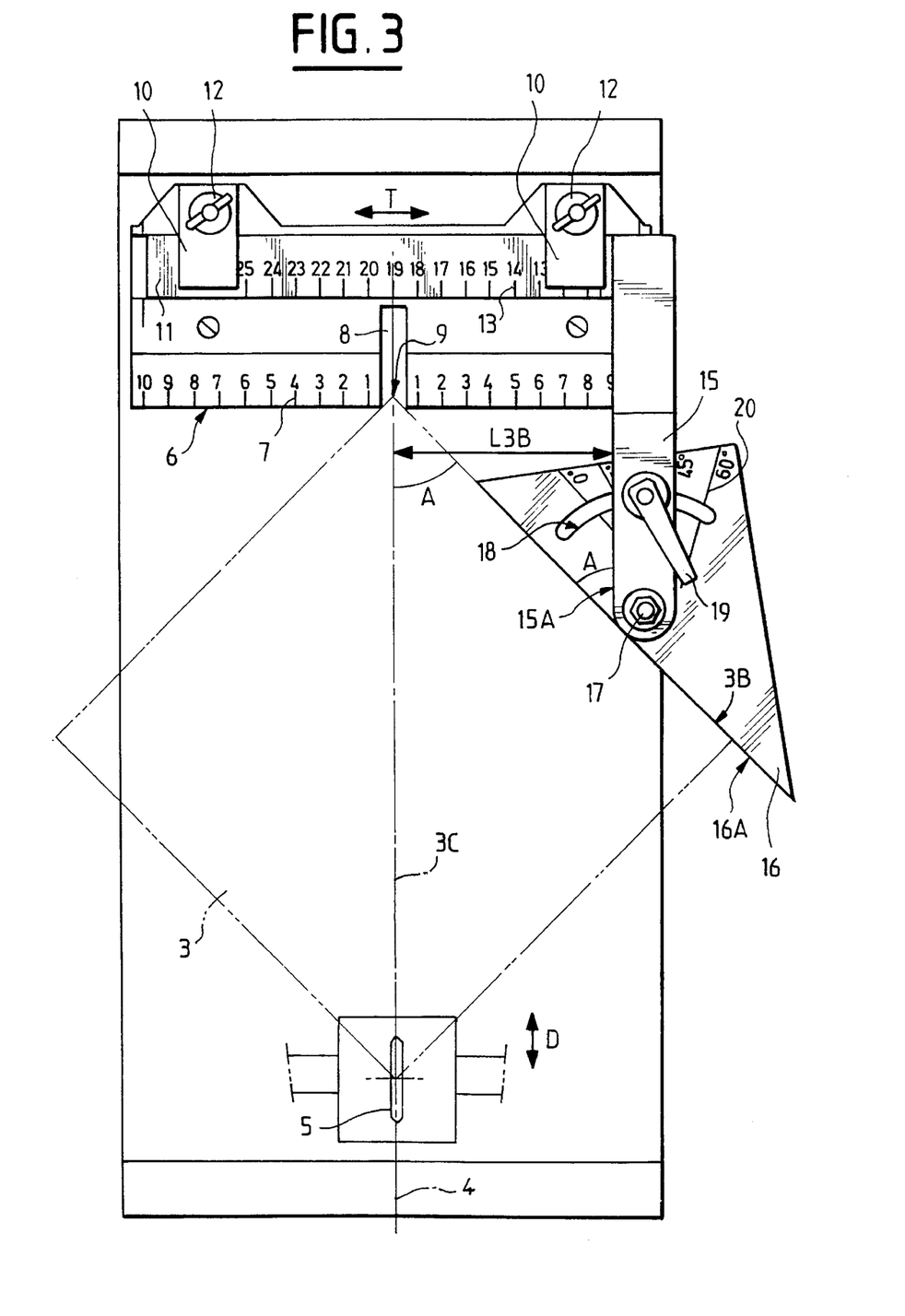
FIG. 3 is a sectional view of the key shown in FIGS. 2A and 2B taken along lines A—A.
Figure 4:
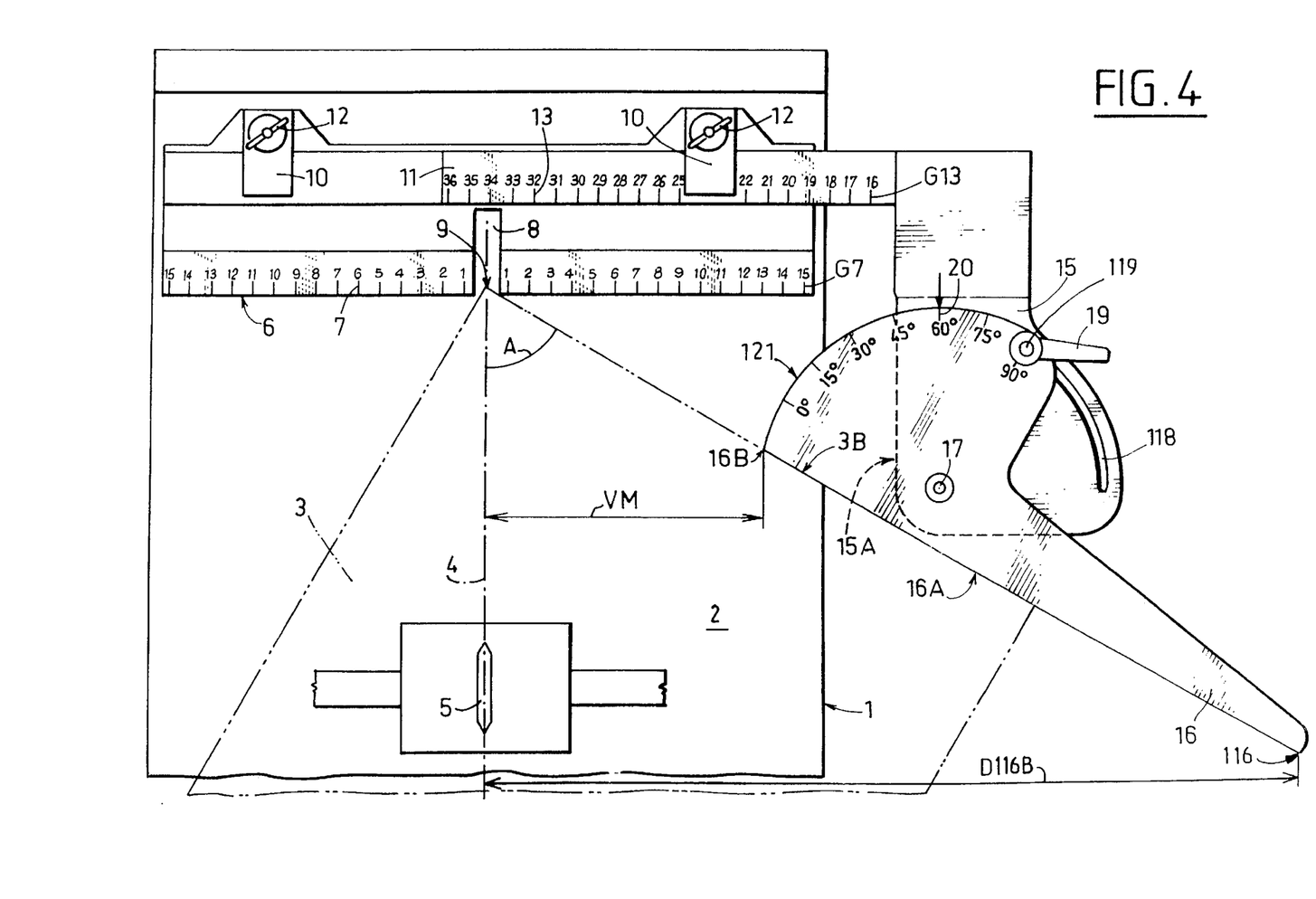
FIG. 4 is a sectional view of the key shown in FIGS. 2A and 2B taken along lines B—B.

FIGS. 2A–2B of the present application illustrate a conventional key with skew cut bittings 10 extending from one side surface 11 of the blade to the other side surface 12 through the thickness of the key blade, i.e., from the upper surface toward the bottom surface in FIG. 3. The bitting nearest the key bow (FIG. 2B) is cut at a deep level, i.e., it extends well toward the bottom edge of the key blade. As seen in the sectional view of FIG. 3, such a deep bitting leaves only the cross-sectional area 13 to provide structural integrity to this area of the key blade. Additionally, major warding groove 15 located below the bitting area significantly reduces the cross-sectional area of the key. The strength of the key blade, however, is not compromised in the areas of the blade which have shallow bittings, such as bitting 10 located near the end of the blade opposite the bow. As seen in FIG. 4, a considerable amount of blank material 14 remains after cutting this bitting into the key blade.

Figure 6:
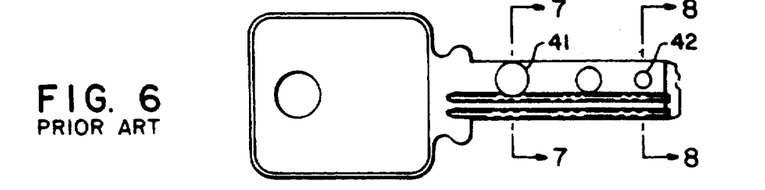
FIG. 6 is plan view of a prior art flat key.
Figure 7:
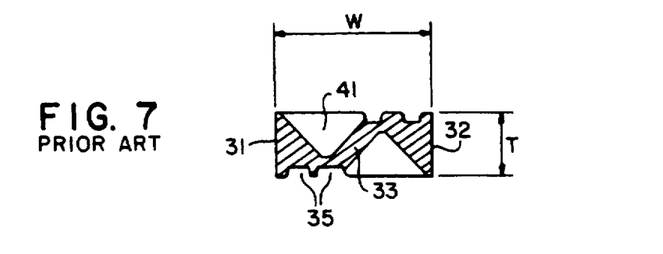
FIG. 7 is a sectional view of the key shown in FIG. 6 taken along lines C—C.
Figure 8:
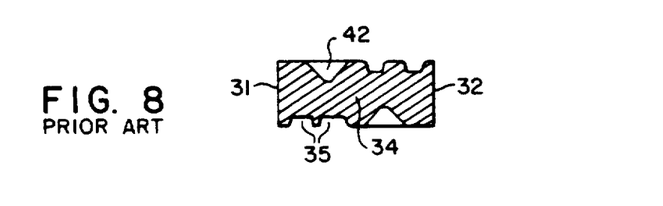
FIG. 8 is a sectional view of the key shown in FIG. 6 taken along lines D—D.

Cylinder locks having horizontal keyways which receive a horizontal flat key are known in the art and the problems discussed above pertain to such flat keys as well. As seen in FIGS. 6–8, a flat key has a rectangular shape with two short sides 31, 32 connecting larger upper and lower flat surfaces, the width W of the key being greater than the thickness T of the key. Flat keys for horizontal keyways are bitted on the large flat upper and/or lower surfaces. The bittings 41, 42 typically comprise recesses which are drilled into the flat surface(s) of the key blade. See, for example, U.S. Pat. Nos. 4,289,002, 4,553,452 and 4,964,288.

FIGS. 7 and 8 illustrate, respectively, deep cut and shallow cut bittings 41 and 42 in a flat key. The deeper bittings (FIG. 7) necessitate removal of a substantial amount of the thickness T of the blade. Also, the bittings become wider as they are cut deeper so as to extend further into the thickness of the blade, which removes even more material and further weakens the key. In the case of a reversible flat key bitted on opposite surfaces (FIG. 7), the blank material remaining to provide strength and prevent breakage of the key is further reduced. Additionally, major grooves 35 significantly reduce the cross-sectional area of the key. Accordingly, the bittings depicted in FIG. 7 significantly reduce the cross-sectional strength of the flat key blade which leads to breakage of the key blades in much the same manner as discussed above regarding standard keys bitted on the narrow upper edge of the blade.

It is evident that the placement of deep bittings, for example such as those shown in FIGS. 3 and 7, results in a weakened area of the key blade which is susceptible to breakage or other failure; however, the placement of deep bittings in key blades is necessary in order to obtain the maximum number of key differs. Accordingly, there is a need in the art for improved keys which possess sufficient strength to prevent their breakage yet permit the placement of both shallow and deep cut bittings in the key blade.

SUMMARY OF THE INVENTION

The present invention provides an improved key and process of cutting a key which overcomes the problems with prior art keys and permits deep bittings to be cut in the key blade without adversely affecting the strength of the blade.

The key includes a bow portion and a blade portion extending from the bow portion. The blade portion has longitudinal grooves forming a profile configured to mate with a corresponding keyway of a lock, and the blade has a flat, generally rectangular shape. The key blade includes large upper and lower surfaces connected by two short side edges or surfaces, providing the blade with a width greater than its thickness. The flat key blade has a plurality of bittings cut into the upper surface which extend across and through at least a portion of the upper surface from one side edge toward the other side edge. The bittings cut through a portion of the thickness of the blade so as to pass through one of the side edges, but preferably not the other side edge. As a result, the key blade may receive deep cut bittings to allow for a great number of keying combinations.

The invention also provides a process for cutting bitting surfaces into the upper surface of the key blade which includes steps of positioning the key blank with the upper side of the key blade oriented (preferably horizontally) to be engaged by a rotary cutter wheel disposed transverse to the longitudinal axis of the key blade. The rotary cutter wheel is moved into the upper surface of the key blade to remove a portion of the thickness of the key blade to form a bitting which is transverse to the longitudinal axis and extends toward the lower side of the key blade.

In another aspect of the invention, a cylinder lock is provided with a horizontal keyway configured to receive the key. The lock includes tumbler pins disposed adjacent, for example above, the keyway, and the pins are lifted to a proper elevation by the bittings on the key. The pins also may be rotated to a proper position by the bittings, in which case the bittings are skew cut across the width of the key blade. The lock contains a rotatable plug with a tenon rotating therewith, the tenon having four corners which provide positive engagement with a tailcam as is known in the art. The horizontal keyway, which extends completely through the plug (a manufacturing expedient), partially overlaps with a corner of the tenon. In prior art locks, this corner of the tenon is removed to allow for the keyway. However, removing the corner of the tenon adversely affects the ability of the tailcam to securely engage the tenon. The lock of the present invention includes a keyway provided with a ward portion (i.e., a portion that extends into the keyway or slot to obstruct part of the slot) overlying the corner of the tenon. This permits all four corners of the tenon to remain intact which provides secure seating of the tailcam on the tenon.

Other features, benefits and advantages of the invention will become apparent from the following detailed description of preferred embodiments thereof taken in conjunction with the accompanying drawings, wherein:

DETAILED DESCRIPTION OF PREFERRED EMBODIMENTS

Figure 1:
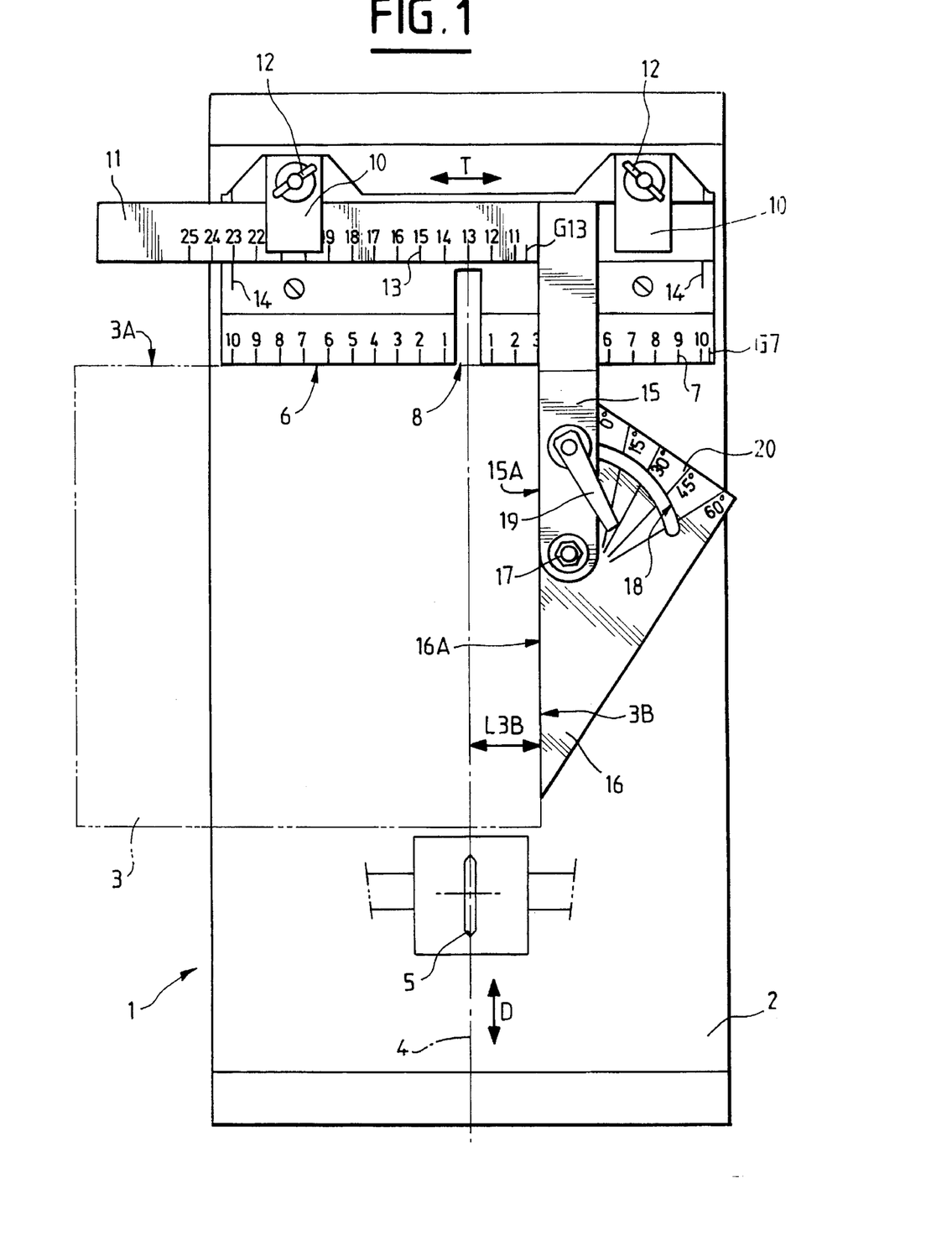
FIG. 1 is a perspective, exploded view of a prior art cylinder lock and key.

FIG. 1 shows a conventional high security lock which is manufactured by Medeco Security Locks, Inc. The lock includes an outer shell 1 in which is positioned a rotatable plug 2 with a keyway configured to receive a key K. The plug has a tenon 3 which, upon operation of the lock, rotates with the plug. A tailcam 4 is secured on the tenon 3 via a nut 5. The tenon typically is in the form of a bolt flattened at the top and bottom to form four corner portions which engage and drive the tailcam 4. The keyway extends completely through the plug and, for manufacturing purposes, extends through the tenon as well. The lock includes a plurality of spring-biased tumbler pins 6 which include holes 7 for receiving the legs 9 of a sidebar 8. Upon insertion of a properly bitted key into the lock, the plug is rotated which forces the sidebar legs 9 into holes 7 and, as is known in the art, rotates the tenon 3 and tailcam 4.

A key for use with the lock of FIG. 1 is shown in detail in FIGS. 2A and 2B and includes a bow portion which is grasped by a user and a blade portion extending away from the bow portion. The blade portion has longitudinal grooves along its side surfaces and a plurality of skew cut bittings 10 in its top surface extending across the width W of the key blade. The bittings 10 are of varying depth, i.e., they extend various distances from the top surface toward the bottom surface of the blade. As such, the amount of material comprising the thickness T of the key which is removed during cutting of the key depends on the depth of the particular bitting.

FIGS. 2A, 2B and 3 show a deep cut bitting 10 which results in the removal of a substantial amount of the blank material in the area of the bitting, with only portion 13 remaining to provide strength and prevent breakage of the key. The bitting depicted in FIG. 3 significantly reduces the cross-sectional volume of the key blade and has resulted in prior art key blades breaking. This problem, though, does not arise when the bittings are shallow and do not cut through a substantial portion of the thickness of the key blade, for example, as in the case of the bitting 10 at the leading edge of the key blade (best seen in FIG. 4). However, as conventional keys are bitted to deeper depths, the remaining cross-sectional volume of the key blade material is reduced and the strength of the key is diminished.

Figure 5:
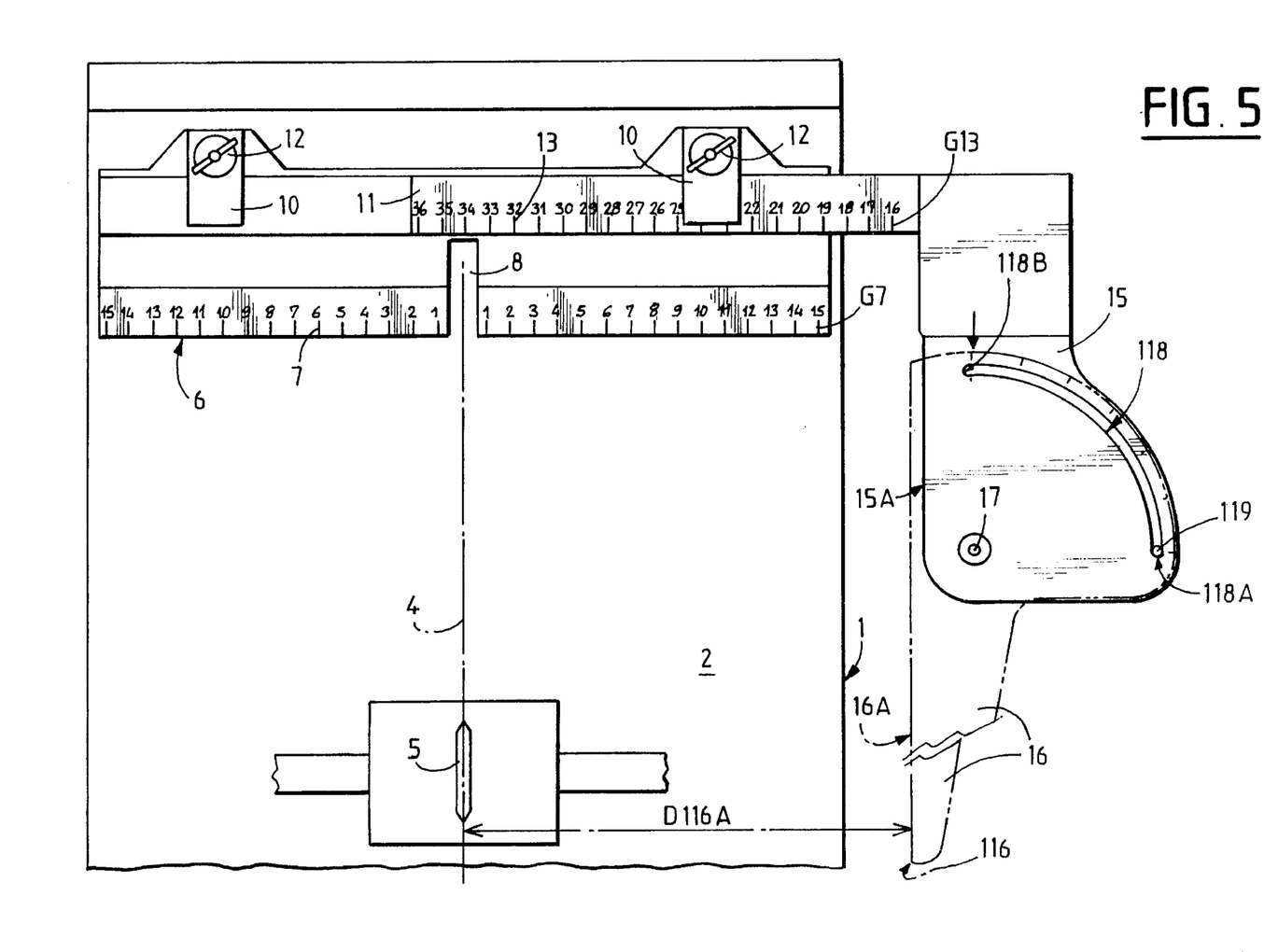
FIG. 5 is a schematic diagram illustrating the manner in which a conventional key is bitted by a rotary cutter.

FIG. 5 shows the manner in which the bittings 10 are cut in the key blade by a rotary cutter wheel (not shown) which moves along an arc 20 having a radius 21. The radius 21 of the cutter is much larger than the width W of the key blade (for example, by a ratio of approximately 10 to 1). Consequently, the bitting surface 10 formed by the cutter wheel is essentially flat across the width of the key blade. This removes the material of the key blade across the entire width of the blade and results in decreased strength as discussed above.

Figure 9:
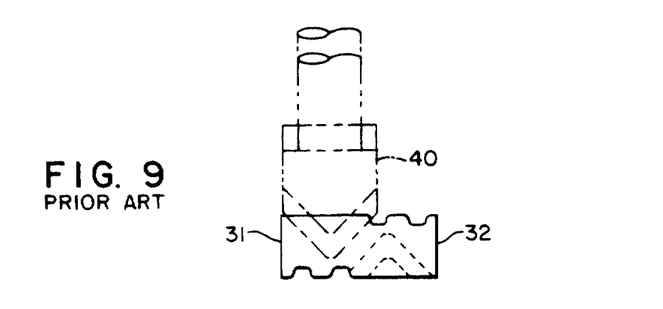
FIG. 9 is a schematic diagram illustrating the manner in which a conventional flat key is bitted by a milling cutter.

FIG. 6 shows a conventional flat key (which is reversible) bitted on the upper and lower surfaces as is known in the art. The problems described above regarding diminished key blade strength caused by deep cut bittings also are present with such flat keys. FIG. 9 shows the manner in which the bittings 41, 42 are milled (or drilled) into the surface of the key blade by a milling cutter 40. Although the bittings do not extend laterally across the width of the key blade, they become wider as they are made deeper into the blade. FIGS. 7 and 8 illustrate, respectively, deep cut and shallow cut bittings 41 and 42. The deeper bittings seen in FIG. 7 necessitate removal of a substantial amount of the material forming the thickness T of the blade. Moreover, in the case of a reversible flat key bitted on opposite surfaces, the portion remaining to provide strength and prevent breakage of the key is further reduced. Consequently, the bittings depicted in FIG. 7 significantly reduce the cross-sectional strength of the flat key blade in much the same manner discussed above regarding standard keys (FIGS. 2A and 2B) which are bitted on the narrow upper edge.

Figure 10A:
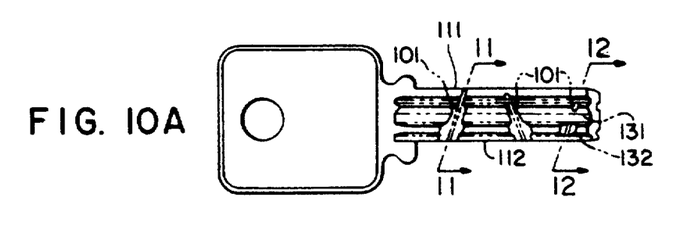
FIGS. 10A and 10B are, respectively, plan and side elevation views of a flat key according to the present invention.
Figure 10B:
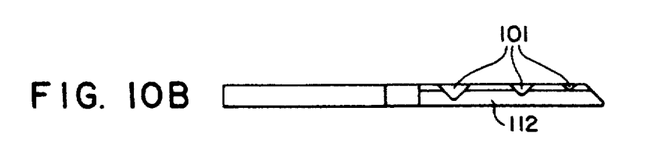

A key constructed according to a preferred embodiment of the present invention is illustrated in FIGS. 10A and 10B and includes a bow portion with a blade portion extending away from the bow portion. The key blade is flat with large upper and lower surfaces and short side edges or surfaces 111, 112. A plurality of bittings 101 are cut across the upper surface of the key blade so as to extend partially into the thickness t of the blade. In a preferred embodiment, the bittings 101 are skew cut, i.e., they are disposed at an oblique angle relative to a longitudinal axis of the key blade; however, the invention may be carried out using bittings which are not skew cut. The key blade has one or more major warding grooves 131, 132 which provide the blade with a profile configured to mate with a correspondingly configured keyway of a lock as is known in the art. As described below, according to the present invention, the location of the major warding groove(s) determines the area in which the deepest bittings are cut so as to minimize the amount of material removed from the key blade.

Figure 11:
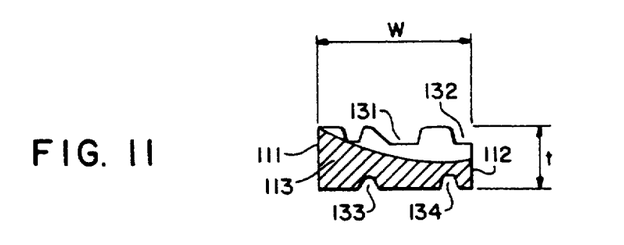
FIG. 11 is a sectional view of the key shown in FIGS. 10A and 10B taken along lines E—E.
Figure 12:
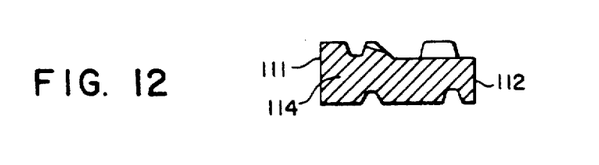
FIG. 12 is a sectional view of the key shown in FIGS. 10A and 10B taken along lines F—F.

FIG. 11 is a sectional view taken along a line passing through deep cut bitting 101 shown in FIGS. 10A and 10B. The bitting 101 is cut through the upper surface of the key blade in a direction extending from side edge 111 toward side edge 112 and, at its deepest point (near the side edge 112), extends through slightly more than one-half of the thickness t of the blade. However, the volume of material 113 of the key blade which remains after cutting is substantial and results in a key blade having great strength to prevent breakage. This is in contrast to prior art keys such as those depicted in FIGS. 3 and 7. Although the keys in FIGS. 3 and 7 also have bittings extending through slightly more than one-half of the thickness T of the key blades, the key blades have a significantly less volume of blank material remaining to provide strength than do the keys of the invention bitted to approximately the same depth. While the key of the present invention is illustrated with bittings on the upper surface of the blade only, persons skilled in the art will recognize that bittings may be placed on the lower surface as well, for example, to form a reversible flat key, or on one or more of the side surfaces of the blade.

In addition, the bittings 101 of the present invention preferably are not flat but rather extend across the width of the key blade in arcuate fashion, thereby further reducing the amount of blank material removed to form the bittings 101. The formation of the aforesaid arcuate bitting surfaces 101 is illustrated schematically in FIG. 13. The key blank is positioned with one of the large surfaces, e.g. the upper side, oriented to be engaged by a rotary cutter wheel (not shown) which is disposed transverse to the longitudinal axis of the key blade. The rotary cutter wheel is moved into the upper side of the key blade and removes a portion of the thickness of the key blade to form a bitting 101 which is transverse to the longitudinal axis and extends toward the lower side of the key blade. Preferably, the bitting 101 cuts through only one of the side edges.

Figure 13:
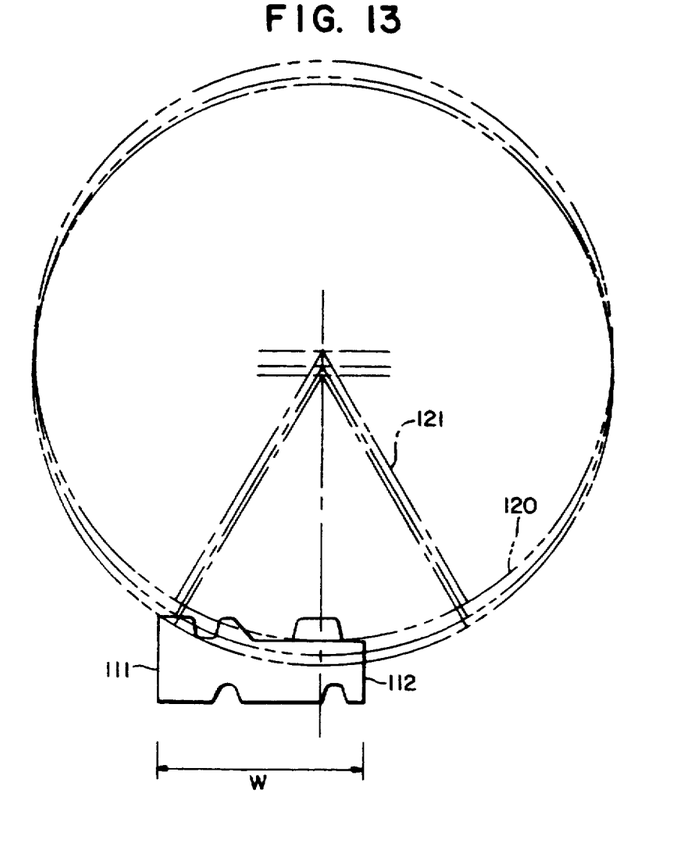
FIG. 13 is a schematic diagram illustrating the manner in which the flat key of the invention is bitted.

As seen in FIG. 13, the rotary cutter wheel describes an arc 120 which passes through the upper surface of the key blade from one side edge 111 toward the opposite side edge 112. However, unlike the prior art (as shown in FIG. 5), the radius 121 of the cutter wheel is approximately equal to the width of the upper surface of the key blade. As a result, the bittings 101 formed by the cutter wheel are arcuate as opposed to the essentially flat surfaces in prior art keys. This aspect of the invention increases the volume of material remaining beneath the bittings which provides a strong key blade that will withstand substantial forces without material failure.

Conventional key blades are provided with warding grooves which form raised and lowered portions on the blade that define a profile which mates with a similarly profiled keyway or slot of a lock. According to the present invention, the location of the major warding groove(s) 131, 132 (FIG. 11) is used to determine the area in which the deepest bittings 101 are placed. As a portion of the blank material is removed to form the warding grooves, the deep bittings can be placed at the same location without removing as much blank material as would be required, for example, to place the deep bittings at an area which does not have a warding groove (or does not have the major warding groove). In a preferred embodiment, the major warding grooves are located on the upper surface of the key blade and, consequently, the deepest bittings also are located on said surface. A key blank constructed according to this aspect of the invention includes a blade portion with warding grooves and designated areas to receive bittings. The area designated to receive the deepest bittings is coextensive with the location of the major warding groove(s). In this manner, the key formed from the blank, despite including deep cut bittings, comprises a substantial volume of material to provide a key which is much stronger than prior art keys.

Figure 14:
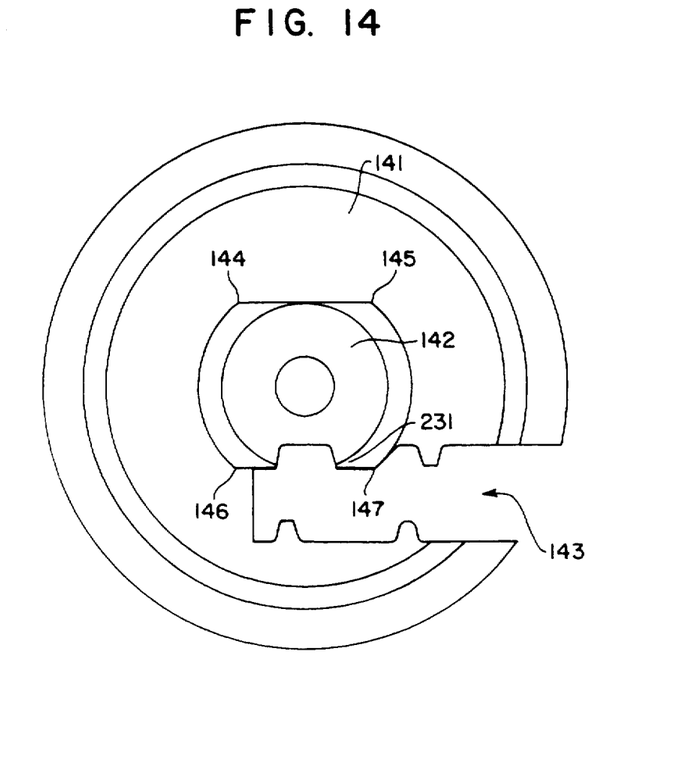
FIG. 14 is a rear elevation view of a cylinder lock according to the invention.

The cylinder lock constructed according to the invention is shown in FIG. 14 (a rear view) and includes a rotatable plug 141 disposed in an outer shell, the plug having a tenon 142 which rotates to drive a tailcam (not shown) which is secured thereto as is known in the art. A keyway 143 extends completely through the plug 141 and, for manufacturing purposes, extends completely through part of the tenon 142 as well. The tenon comprises four corner portions 144–147 on which the tailcam seats. However, in prior art locks the keyway passes through the tenon so as to overlie a corner portion thereof, which requires a corner of the tenon to be removed to form the keyway. Removal of one of the tenon corners may adversely affect engagement of the tailcam with the tenon, which in turn impacts the operation of the lock.

According to the invention, the keyway 143 of the lock is formed with a warding groove 231 which extends sufficiently deep into the keyway so as to obviate the need to remove corner 147 of the tenon. As a result, the corners of the tenon remain intact and provide secure engagement with the tailcam. The embodiment shown in FIG. 14 is only exemplary of the different manners in which this aspect of the invention may be applied to cylinder locks. For example, more or less than four tenon corners may be utilized, and the keyway may have many different warding configurations.

Although the present invention has been described with reference to particular embodiments, it is to be understood that the embodiments are merely illustrative of the application of the principles of the invention. Numerous configurations may be made therewith and other arrangements may be devised without departing from the spirit and scope of the invention.

What is claimed is:

1. A key having improved cross-sectional strength, the key comprising:

a key bow configured to be handled by a user;

a key blade extending away from the key bow, the key blade having a generally rectangular shape in cross-section and including upper and lower surfaces defining a thickness of the key blade, and opposite side surfaces extending between the upper and lower surfaces and defining a width of the key blade, wherein the width of the key blade is greater than the thickness of the key blade; and at least one bitting formed in the key blade, the bitting cutting through the upper surface of the key blade along a direction extending from one side surface to the other side surface of the key blade, wherein the bitting is an arcuate surface that passes through only one of the side surfaces of the key blade, the arcuate surface lying on an arc which extends transversely to a longitudinal axis of the key blade.

2. A key according to claim 1, wherein the bitting defines a sloping surface with a leading edge and a trailing edge which are offset from each other in a direction parallel to one of the side surfaces of the key blade.

3. A key according to claim 1, wherein the bitting is skewed at an angle relative to a longitudinal axis of the key blade.

4. A key according to claim 1, wherein the bitting extends substantially completely across the upper surface of the key blade from adjacent one of the side surfaces to the other side surface of the key blade.

5. A cylinder lock in combination with a key, the combination comprising:

a cylinder lock including a horizontal keyway configured to receive a flat key having a width greater than its thickness, the lock including a rotatable plug disposed in a housing and a plurality of tumbler pins located adjacent the keyway, the tumbler pins adapted to be engaged by bittings located on a flat key blade to permit the plug to rotate relative to the housing to operate the lock;

a flat key including a key bow and a key blade extending away from the key bow, the key blade having a generally rectangular shape in cross-section including upper and lower surfaces defining a thickness of the key blade, and opposite side surfaces extending between the upper and lower surfaces and defining a width of the key blade, wherein the width is greater than the thickness and the key blade has a generally flat configuration; and a plurality of bittings formed in the upper surface of the key blade, wherein at least one of said bittings is an arcuate surface formed transversely to a longitudinal axis of the key blade and across a central portion of said upper surface along a direction extending from one side surface to the other side surface of the key blade, and wherein said at least one bitting passes through only one of the side surfaces of the key blade.

6. The combination of claim 5, wherein said at least one bitting is skewed at an angle relative to a longitudinal axis of the key blade.

7. The combination of claim 5, wherein said at least one bitting extends substantially completely across the upper surface of the key blade from adjacent one of the side surfaces to the other side surface of the key blade.

8. The combination of claim 5, wherein each of the plurality of bittings formed in the upper surface of the key blade extends from one side surface to the other side surface of the key blade and passes through only one of the side surfaces of the key blade.

9. The combination of claim 5, wherein the key blade has a plurality of grooves formed therein, the grooves running longitudinally along at least a portion of the length of the key blade and extending into the thickness of the key blade at various depths and across the width of the key blade at various distances, and wherein the at least one bitting passes through the deepest groove.

10. The combination of claim 5, wherein the tumbler pins are lifted and rotated to a proper position by the bittings formed in the upper surface of the key blade.

11. The combination of claim 5, wherein the lock includes a tenon extending rearwardly from the plug and rotating with said plug, the tenon having a plurality of corner portions for positively engaging and rotating a tailcam, and wherein the keyway at least partially cuts through the tenon but has a ward portion located at one of the corner portions of the tenon to maintain all of the corner portions of the tenon intact.

12. The combination of claim 11, wherein the tenon has four corner portions and a tailcam is secured to the tenon and engages all four corner portions of the tenon.

13. The combination of claim 11, wherein the key is shaped to correspond substantially to the keyway and includes a groove running along the longitudinal axis of the key, said groove cooperating with said ward in the keyway located in one of the corner portions of said tenon.

* * * * *

UNITED STATES PATENT AND TRADEMARK OFFICE
CERTIFICATE OF CORRECTION

PATENT NO. : 5,615,565            Page 1 of 8

DATED : April 1, 1997

INVENTOR(S) : Peter H. Field

It is certified that error appears in the above-identified patent and that said Letters Patent is hereby corrected as shown below:

In the drawings: Figs. 1 thru Fig. 5, should be deleted and substituted with the attached figs. 1 thru fig. 14.

Signed and Sealed this

Eighth Day of September, 1998

*Attest:*

BRUCE LEHMAN

*Attesting Officer*       *Commissioner of Patents and Trademarks*